(12) United States Patent
Jung

(10) Patent No.: US 7,450,841 B2
(45) Date of Patent: Nov. 11, 2008

(54) CAMERA ROTATING APPARATUS OF PORTABLE TERMINAL

(75) Inventor: Tae Kyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 280 days.

(21) Appl. No.: 11/258,774

(22) Filed: Oct. 25, 2005

(65) Prior Publication Data

US 2006/0088310 A1   Apr. 27, 2006

(30) Foreign Application Priority Data

Oct. 27, 2004   (KR) .................... 10-2004-0086365

(51) Int. Cl.
*G03B 17/48* (2006.01)
*G03B 19/00* (2006.01)
*G03B 29/00* (2006.01)
*G03B 17/02* (2006.01)
*H04N 5/225* (2006.01)
*H04M 1/00* (2006.01)

(52) U.S. Cl. .............. 396/429; 396/535; 348/333.06; 348/376; 455/575.4

(58) Field of Classification Search ......... 396/429,535; 348/14.01–14.03, 151, 158, 294, 333.01, 348/333.06, 376; 455/90.3, 422.1, 517, 550.1, 455/556.1, 556.2, 575.1, 575.4
See application file for complete search history.

(56) References Cited

U.S. PATENT DOCUMENTS

| 6,751,473 B1 * | 6/2004 | Goyal et al. ............. 455/556.1 |
| 2001/0004269 A1 * | 6/2001 | Shibata et al. .......... 348/333.06 |

FOREIGN PATENT DOCUMENTS

| JP | 2002-050999 | 2/2002 |
| KR | 1020010010774 A | 2/2001 |

* cited by examiner

*Primary Examiner*—Rochelle-Ann Blackman
(74) *Attorney, Agent, or Firm*—Lee, Hong, Degerman, Kang & Waimey

(57) ABSTRACT

A camera rotating apparatus of a portable terminal includes a main body of the portable terminal, a head portion including a camera module, the head portion being capable of rotating in front, rear, left and right directions with respect to the main body, and a hinge portion rotatably connecting the head portion to the main body.

16 Claims, 13 Drawing Sheets

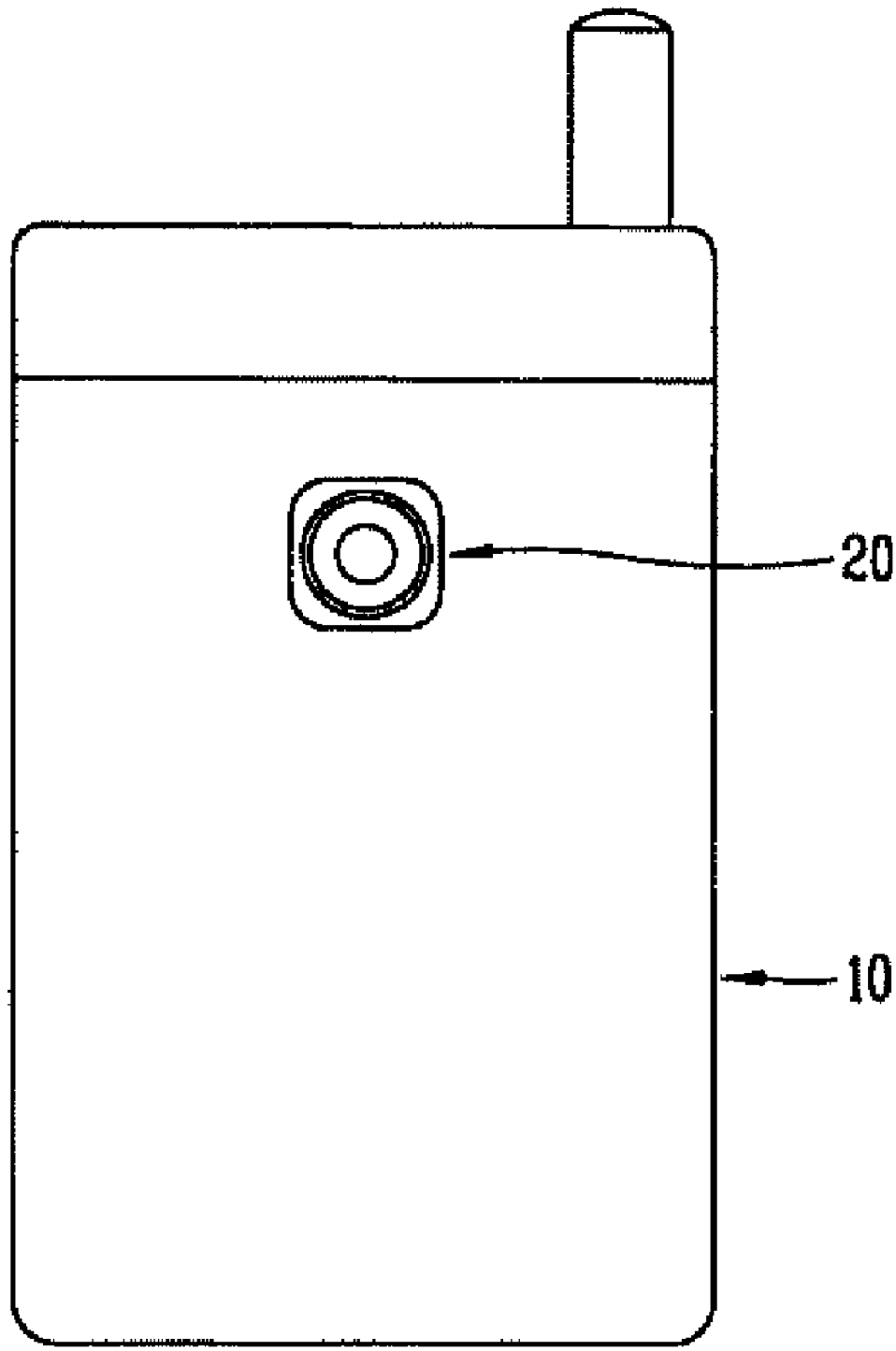
FIG.1
PriorArt

FIG.2
PriorArt
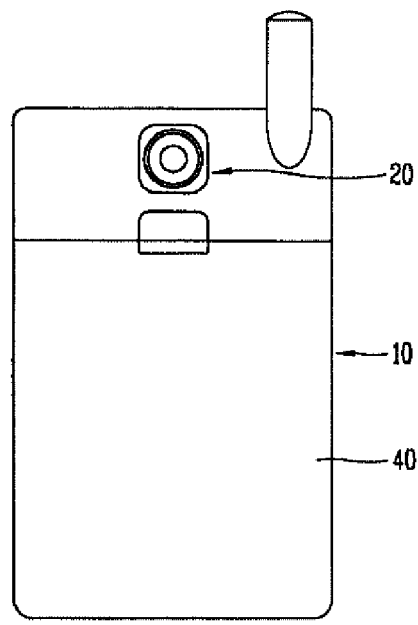
FIG.3
PriorArt
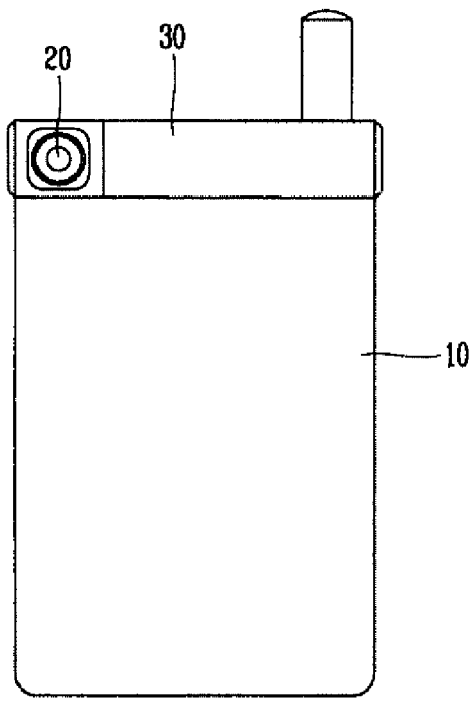

FIG.4
PriorArt
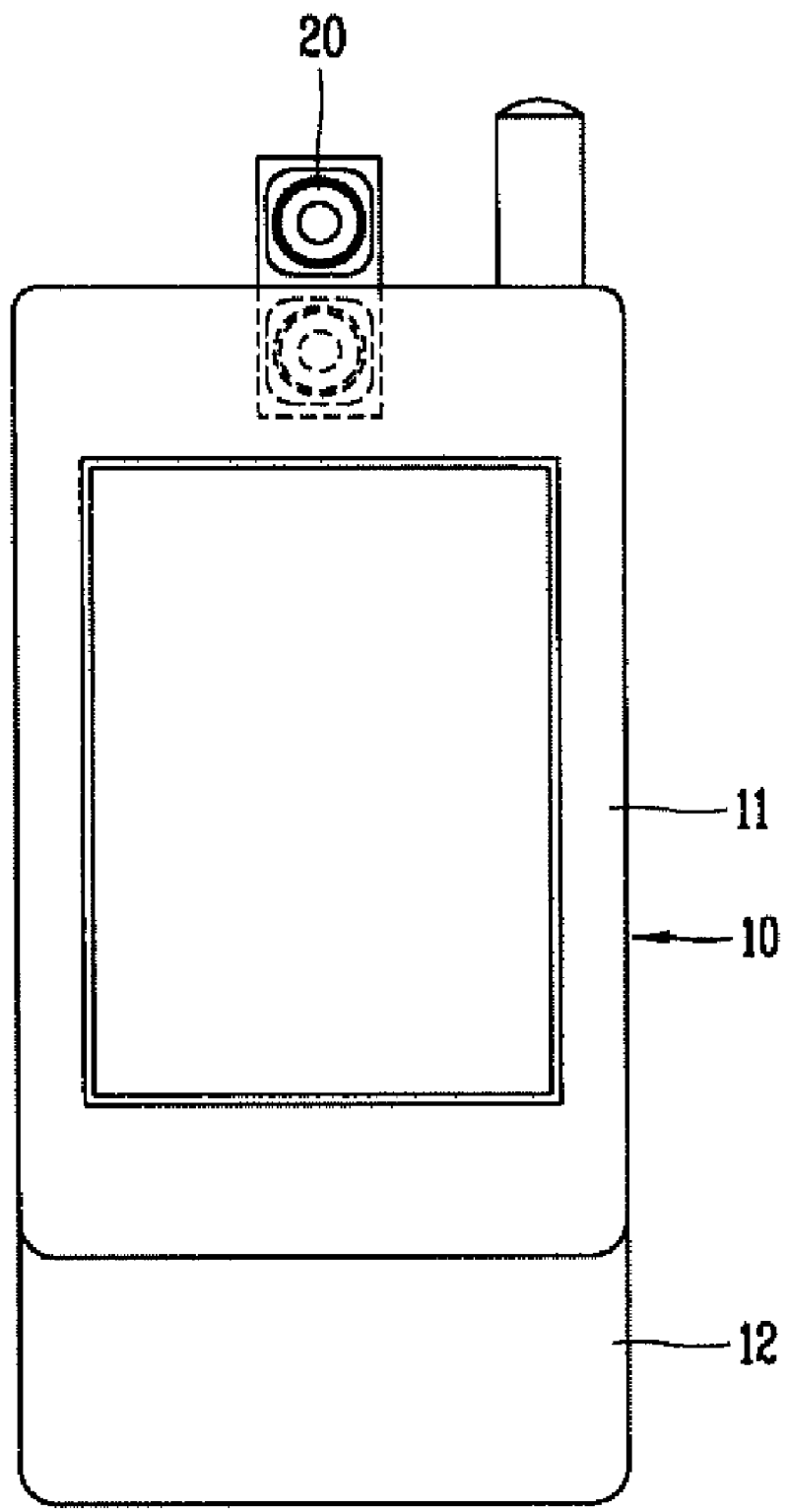

FIG.5
PriorArt
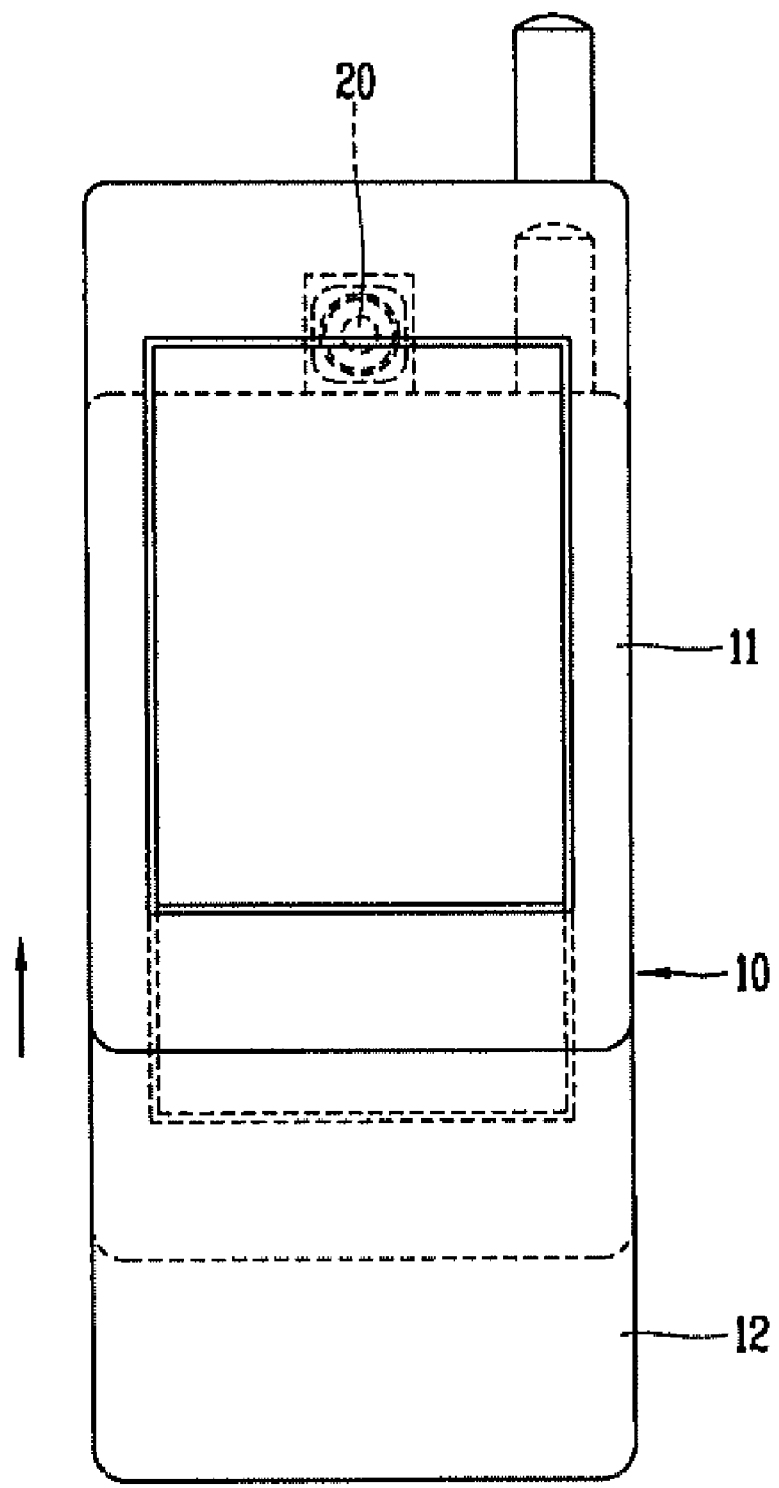

FIG.6
PriorArt
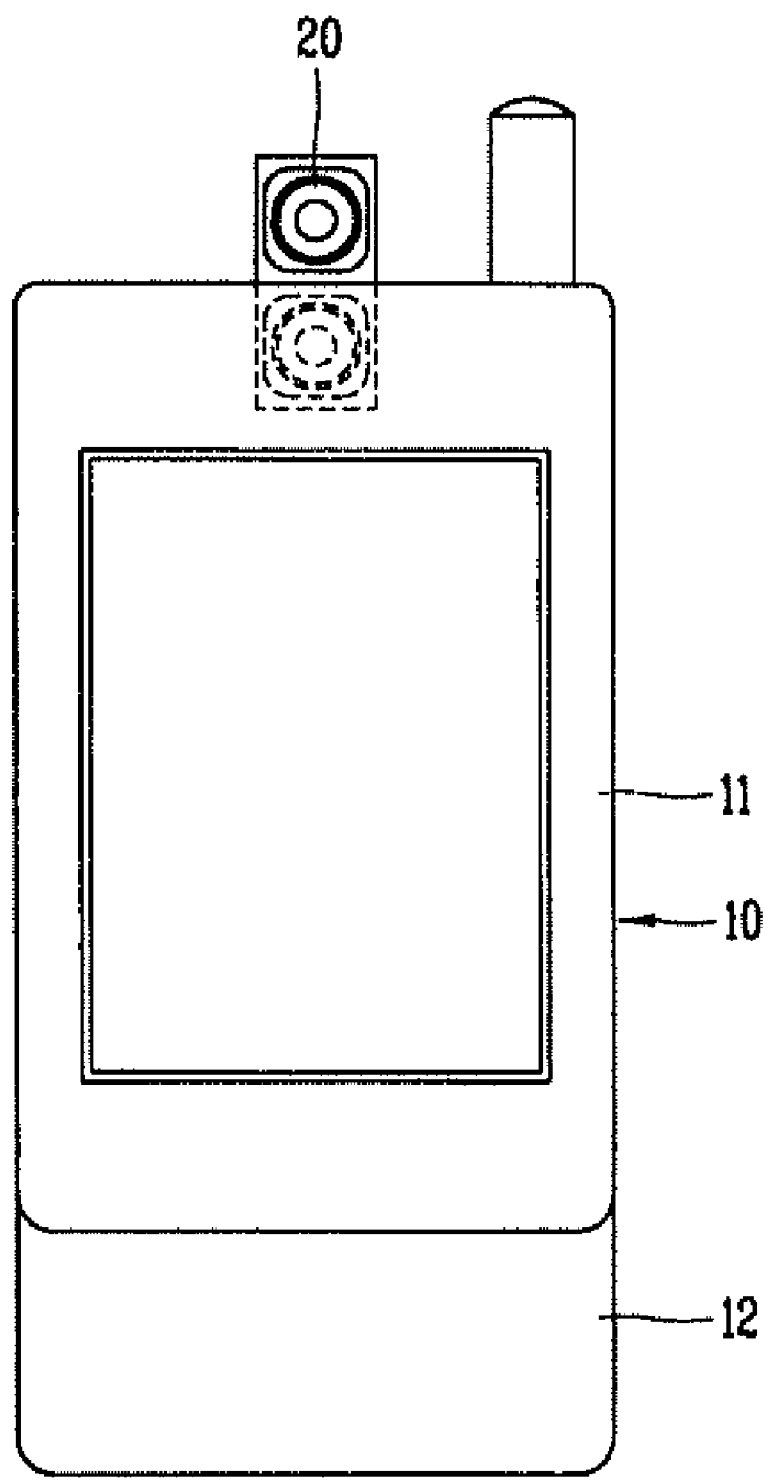

CAMERA ROTATING APPARATUS OF PORTABLE TERMINAL

CROSS REFERENCE TO RELATED APPLICATIONS

Pursuant to 35 U.S.C. § 119(a), this application claims the benefit of earlier filing date and right of priority to Korean Patent Application No. 10-2004-0086365, filed on Oct. 27, 2004, the content of which is hereby incorporated by reference herein in its entirety.

BACKGROUND OF THE INVENTION

1. Field of the Invention

The present invention relates to a camera rotating apparatus of a portable terminal.

2. Description of the Related Art

In recent years, a camera has been provided on a portable terminal such as a mobile phone.

FIG. 1 shows a conventional folder type mobile phone where a camera 20 is fixedly mounted on a main body case 10. FIG. 2 shows another conventional folder type mobile phone where a battery 40 is coupled to a rear portion of a main body case 10 and a camera 20 is fixedly mounted above the battery 40 on the rear portion of the main body case 10. FIG. 3 shows still another conventional mobile phone where a camera 20 is rotatably installed on a hinge portion 30 formed on a main body case 10. FIGS. 4 and 5 show a conventional slide type mobile phone where upper and lower cases 11 and 12 of a main body case 10 are designed to slide up and down and a camera 20 is installed on the upper case 11. FIG. 6 shows a conventional slide type mobile phone where upper and lower cases 11 and 12 of a main body case 10 are designed to slide up and down and a camera 20 is installed on the upper case 11 to be capable of rotating about a hinge portion.

For the folder type mobile phones that are depicted in FIGS. 1 and 2, since the cameras are fixed on the folder, they cannot provide a self-camera function.

For the rotating camera depicted in FIG. 3, it is inconvenient to rotate a front case of the folder. Furthermore, due to the size limitation of the hinge portion, it is difficult to mount a high definition camera module. In addition, since the camera module is one-sided in a direction due to the hinge structure, the object focusing is one-sided when the user takes a picture.

For the slide type camera illustrated in FIGS. 4 and 5, it can provide the self-camera function. However, when it is in a slide-up state, it cannot provide the self-camera function. For the slide type camera depicted in FIG. 6, since the camera module is one-sided due to the hinge structure, the object focusing is also one-sided during the self-photographing.

That is, in the conventional portable terminals with the camera, the camera is generally mounted on the front, rear, or top of the main body. However, these structures make it difficult to accurately adjust the focus when the user takes a picture. Furthermore, in some cases, it is difficult to take the self-photographing.

SUMMARY OF THE INVENTION

Accordingly, the present invention is directed to a camera rotating apparatus of a portable terminal that substantially obviates one or more problems due to limitations and disadvantages of the related art.

It is an object of the present invention to provide a camera rotating apparatus that can allow a camera to rotate in an omni-direction with respect to a main body of the terminal.

It is another object of the present invention to provide a camera rotating apparatus that can accurately adjust an object focus by allowing a head portion with a camera module to be adjusted in an omni-direction.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly selected out in the written description and claims hereof as well as the appended drawings.

To achieve these objects and other advantages and in accordance with the purpose of the invention, as embodied and broadly described herein, there is provided a camera rotating apparatus of a portable terminal, including: a main body of the portable terminal; a head portion having a camera module, the head portion being capable of rotating in front, rear, left and right directions with respect to the main body; and a hinge portion rotatably connecting the head portion to the main body.

In another aspect of the present invention, there is provided a camera rotating apparatus of a portable terminal, including: a main body of the portable terminal; a head portion having a camera module, the head portion being capable of rotating in front, rear, left and right directions with respect to the main body; a first hinge member for rotating the head portion in the front and rear directions with respect to the main body; a second hinge member for rotating the head portion in the left and right directions with respect to the main body; and a hinge coupling member for selectively suppressing the rotation of the head portion by allowing the first and second hinge members to be received in or withdrawn from the main body.

In still another aspect of the present invention, there is provided a camera rotating apparatus of a portable terminal, including: a main body of the portable terminal, the main body including a slide case coupled to a main case by a sliding assembly to be capable of sliding with respect to the main case; a head portion comprising a camera module, the head portion being capable of rotating in front, rear, left and right directions with respect to the main body; a hinge coupling portion provided on the slide case; a first hinge member for rotating the head portion in the front and rear directions with respect to the main body; and a second hinge member for rotating the head portion in the left and right directions with respect to the main body.

The head portion may include a camera module and a speaker.

The rotation of the head portion may be selectively suppressed by a hinge member.

The hinge member may be capable of being received in or withdrawn from the main body of the portable terminal so that the head portion can closely contact the main body or be projected from the main body to be capable of rotating in an omni-direction.

According to the camera rotating apparatus of the portable terminal of the present invention, since the head portion is rotatably mounted on an upper end of the main body case of the portable terminal, the self-photographic becomes possible by rotating the camera and the object focus is not one-sided. In addition, since the speaker can be disposed on the head portion, the sound output direction can be adjusted by rotating the head portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a front view of a conventional folder type mobile phone where a camera is mounted on a front portion of a main body case;

FIG. 2 is a rear view of another conventional folder type mobile phone where a camera is mounted on an upper-rear portion of a main body case;

FIG. 3 is a front view of still another conventional folder type mobile phone where a camera is mounted on a hinge portion of a main body case;

FIGS. 4 and 5 are front views of a conventional slide phone where a camera is mounted on an upper end of a lower case of a main body;

FIG. 6 is a front view of another conventional slide phone where a camera is rotatably coupled to a hinge portion formed on an upper end of an upper case of a main body;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 7:
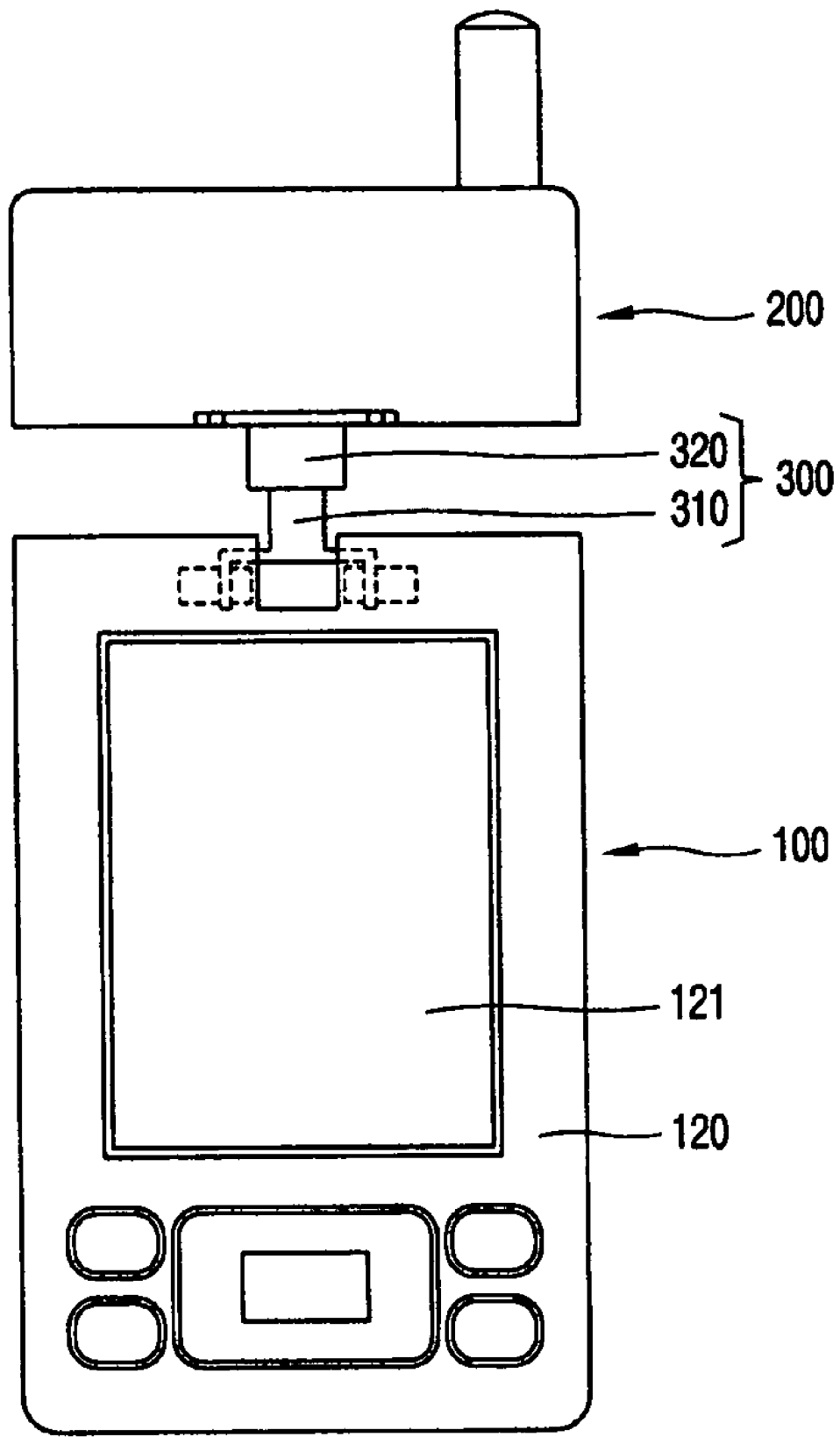
FIGS. 7 through 9 are respectively front, rear and side views of a portable terminal having a camera rotating apparatus according to an embodiment of the present invention.

FIG. 7 shows a front portion of a portable terminal with a camera rotating apparatus according to an embodiment of the present invention. The portable terminal includes a main body case 100, a head portion 200 having a camera module and mounted on an upper end of the main body case 100 to be capable of rotating in an omni-direction, and a hinge portion 300 for rotatably connecting the head portion 200 on the main body case 100.

A main printed circuit board (PCB) (not shown) is provided in the main body case 100 to input information and control the communication. There is a slide case 120 having an upper case. A display 121 such as a liquid crystal display (LCD) is provided on a front surface of the upper case.

The head portion 200 is coupled on an upper end of the slide case 120 to be capable of rotating in the omni-direction. The hinge portion 300 includes a first hinge portion 310 pivotally coupled to the main body case 100 and a second hinge portion 320 having a first end pivotally coupled to the first hinge portion 310 and a second end integrally coupled to the head portion 200.

The head portion 200 is capable of rotating in front and rear directions of the main body case 100 about a center of the first hinge portion 310 by a predetermined rotational angle and capable of rotating in left and right direction of the main body case 100 about the second hinge portion 320 by a predetermined rotational angle.

In order to prevent a lower portion of the head portion 200 from interfering an upper portion of the slide case 120 when the head portion 200 rotates in the front and rear directions of the main body case 100 about the first hinge portion 310, the hinge portion 300 is elevated upward from the slide case 120. Therefore, the head portion 200 is designed to be spaced apart from the upper portion of the slide case 120.

Since the head portion 200 having the camera module 210 is designed to be capable of rotating in the front, rear, left and right directions, the user can adjust the direction of the head portion 200 according to the scene he/she intends to take. Furthermore, since the hinge structure is symmetrically formed, the camera module is to be located on a center of the head portion. Therefore, the user can take a picture without the object focus one-sided.

When the user intends to carry or keep the portable terminal, the first hinge portion 310 slides down into the main body case 100. That is, the head portion 200 closely contacts the main body case 100.

Figure 8:
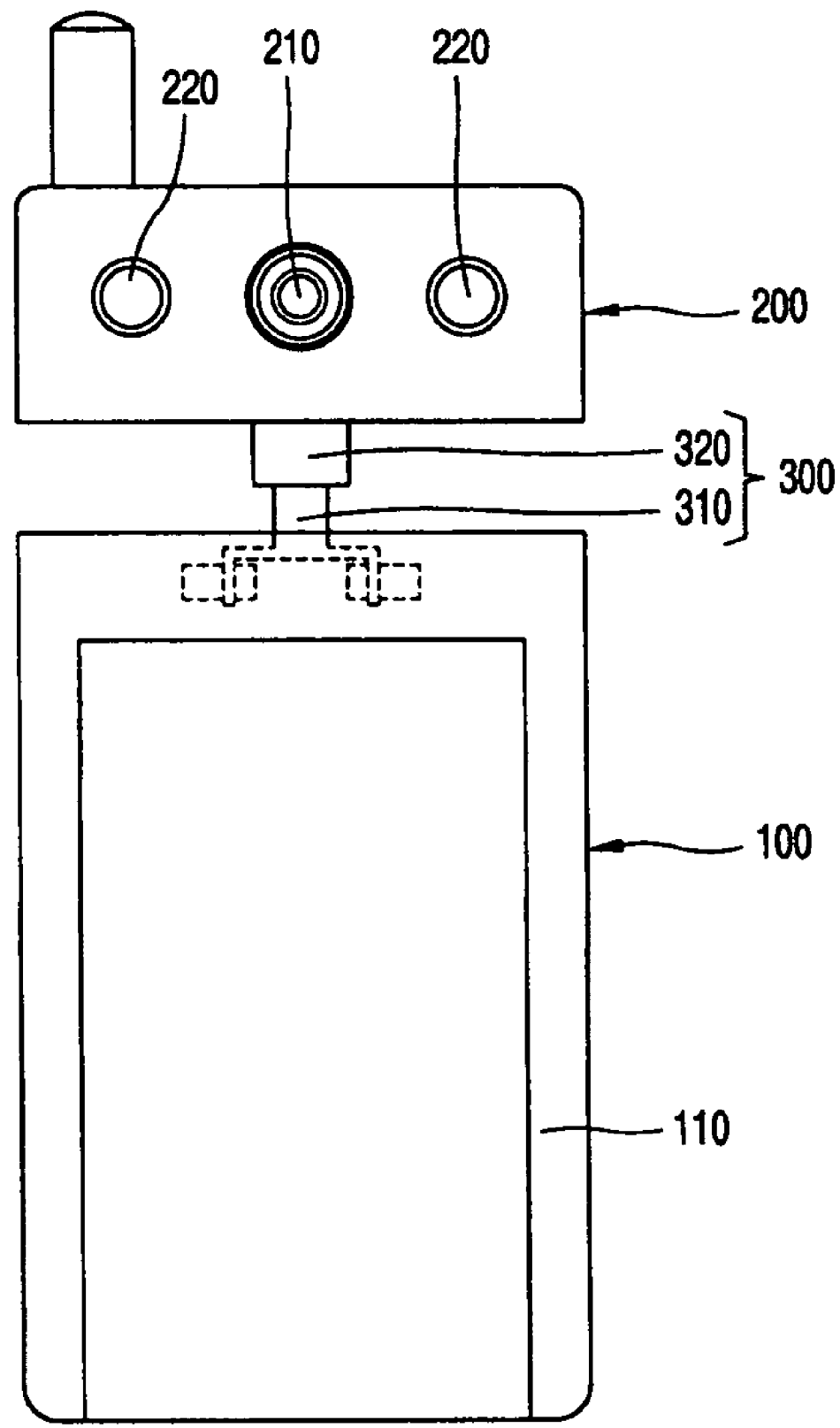

FIG. 8 shows a rear portion of the portable terminal with the camera rotating apparatus according to the present invention. The main body case 100 includes a main case 110 provided with a keypad and a slide case 120 provided with a display. The main case 110 and the slide case 120 can be opened and closed as they slides in their longitudinal directions. The camera module 210 is provided on a mid-portion of the head portion 200. Speakers 220 are provided on the head portion 200 at the both sides of the camera module 210. As described above, the hinge portion 300 includes the first and second hinge portions 310 and 320.

When the user takes a picture, the user can adjust the direction of the head portion 200 according to the scene he/she intends to take. By the symmetrical hinge structure illustrated in FIGS. 7 and 8, the camera module can be located on the center of the head portion. In addition, since the speakers 220 are formed on the head portion 200, the sound output direction can be adjusted by rotating the head portion 200.

Figure 9:
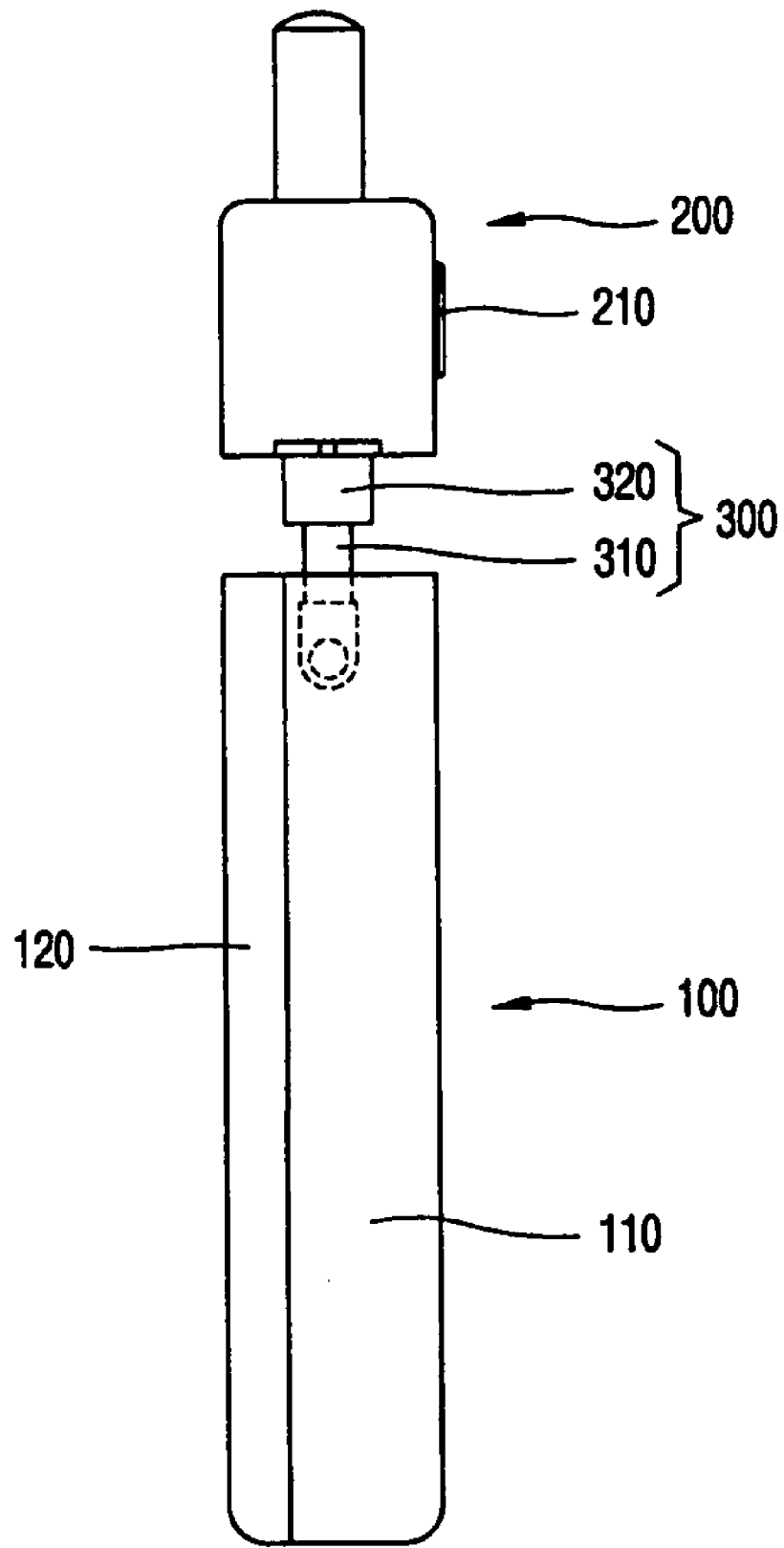

FIG. 9 shows a side portion of the portable terminal with the camera rotating apparatus according to the present invention.

As described above, the main body case 100 includes the main case 110 provided with a keypad and the slide case 120 provided with a display. The main case 110 and the slide case 120 can be opened and closed as they slides in their longitudinal directions. The head portion 200 with the camera module 210 is provided on the upper end of the slide case 120 to be capable of rotating in the omni-direction by the hinge portion 300. As described above, the hinge portion 300 includes the first and second hinge portions 310 and 320.

Figure 10:
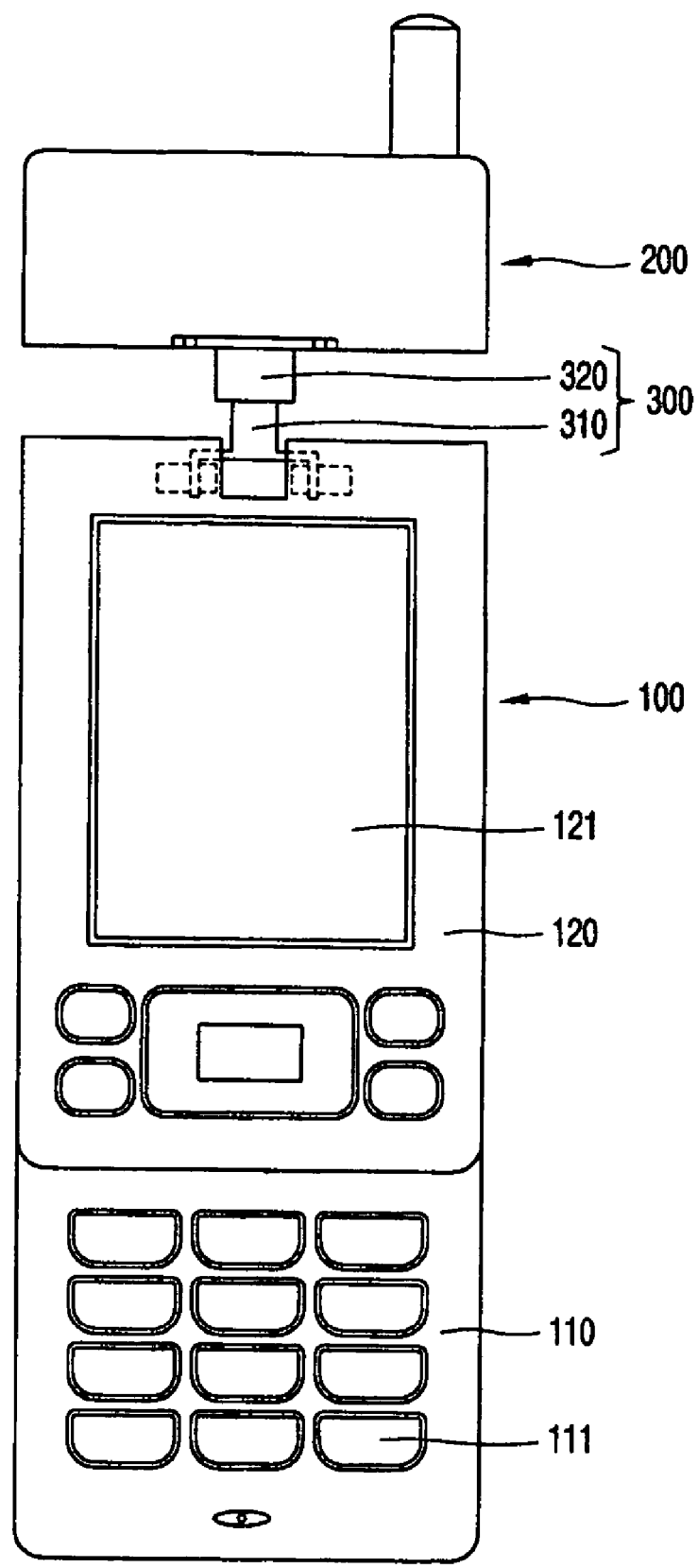
FIGS. 10 through 12 are respectively front, side and rear views illustrating an operation of a portable terminal having a camera rotating apparatus according to an embodiment of the present invention.

FIG. 10 shows the front portion of the portable terminal with the camera rotating apparatus to illustrate the operation of the portable terminal.

The main PCB (not shown) is provided in the main body case 100 to input the information and control the communication. The main case 110 is provided with the keypad 111 and the slide case 120 is provided at the front surface with the display 121 such as the LCD. The main case 110 and the slide case 120 can be opened and closed as they slides in their longitudinal directions.

The head portion 200 is coupled to the upper end of the slide case 120 to be capable of rotating left, right, front and rear directions by the hinge portion 300 having the first and second hinge portions 310 and 320.

Figure 11:
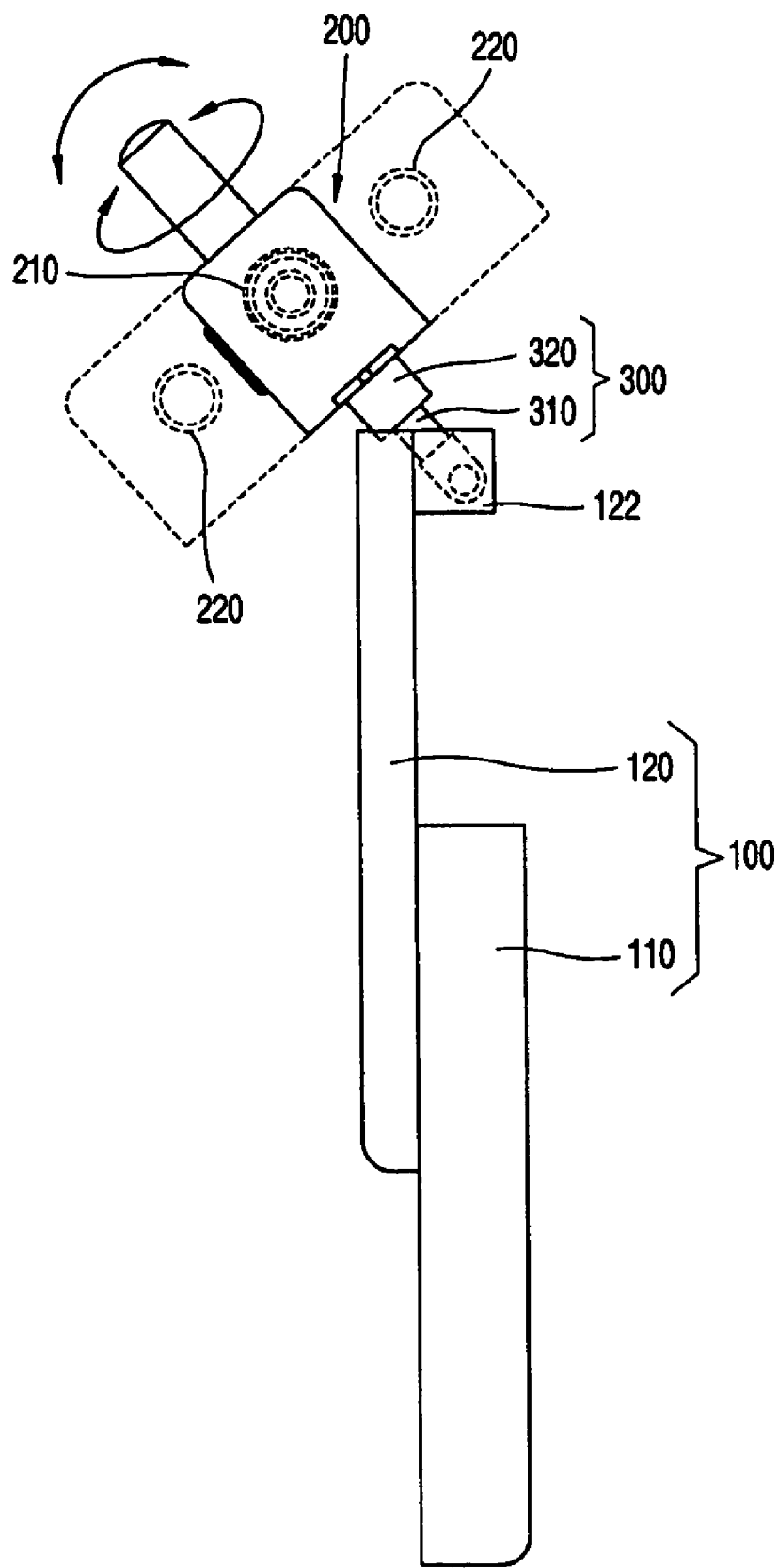

FIG. 11 shows the side portion of the portable terminal with the camera rotating apparatus to illustrate the operation of the portable terminal.

As described above, the main body case 100 includes the main case 110 and the slide case 120. The main case 110 and the slide case 120 can be opened and closed as they slides in their longitudinal directions.

The head portion 200 with the camera module 210 is provided on the upper end of the slide case 120 to be capable of rotating in the omni-direction by the hinge portion 300. The camera module 210 and the speakers 220 are disposed on the head portion 200.

The hinge portion 300 includes the first hinge portion 310 pivotally coupled to the main body case 100 and the second hinge portion 320 having the first end pivotally coupled to the first hinge portion 310 and the second end integrally coupled to the head portion 200.

As shown in FIG. 11, the head portion 200 is capable of rotating in the front and rear directions of the main body case 100 about the center of the first hinge portion 310 by a predetermined rotational angle and capable of rotating in left and right direction of the main body case about the second hinge portion 320 by a predetermined rotational angle.

In order to prevent the lower portion of the head portion 200 from interfering an upper portion of the slide case 120 when the head portion 200 rotates in the front and rear directions of the main body case 100 about the first hinge portion 310, the hinge portion 300 is elevated upward from the slide case 120. Therefore, the head portion 200 is designed to be spaced apart from the upper portion of the slide case 120.

In order to make a phone call, illustrated in FIGS. 10 and 11, the user slides up the slide case 120 with respect to the main case 110 using a slide mechanism. In addition, the user can rotate the head portion 200 with the camera module 210 about the hinge portion 300 in the left, right and front and rear directions according to the scene he/she intends to take. Furthermore, the sound output direction of the speakers 220 can be adjusted by rotating the head portion 200.

Figure 12:
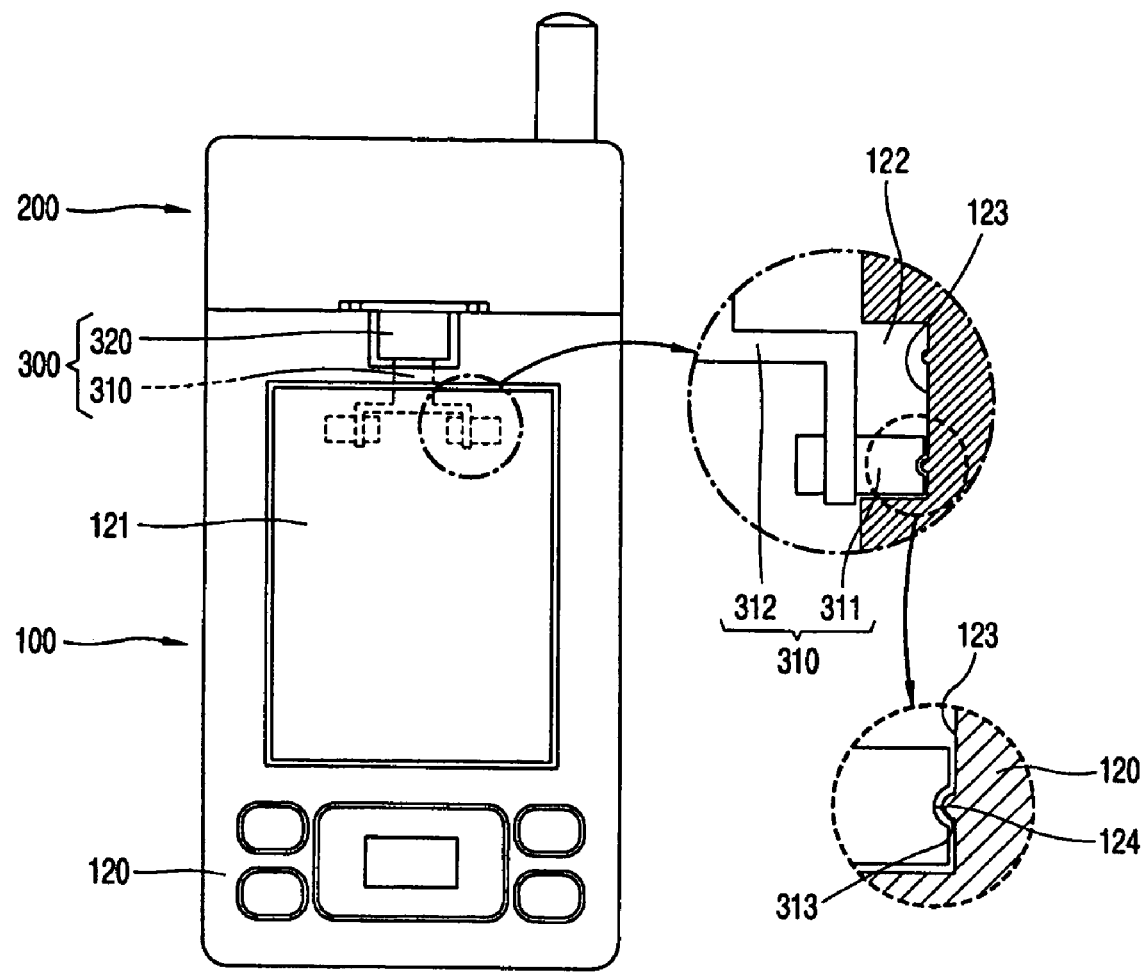

FIG. 12 shows the rear portion of the portable terminal with the camera rotating apparatus to illustrate the operation of the portable terminal.

As described above, the main body case 100 includes the main case 110 provided with the keypad 11 and the slide case 120 provided with the display 121. The main case 110 and the slide case 120 can be opened and closed as they slides in their longitudinal directions. The head portion 200 with the camera module 210 is provided on the upper end of the slide case 120 to be capable of rotating in the omni-direction by the hinge portion 300. The camera module 210 and the speakers 220 are disposed on the head portion 200.

The hinge portion 300 includes the first hinge portion 310 pivotally coupled to the main body case 100 and the second hinge portion 320 having the first end pivotally coupled to the first hinge portion 310 and the second end integrally coupled to the head portion 200.

The first hinge portion 310 includes a fixing portion 311 coupled to a hinge coupling portion 122 of the slide case 120 and a rotational portion 312 coupled to the slide case 120 to be capable of rotating in the front and rear directions about the fixing portion 311. The second hinge portion 320 is integrally coupled to a lower portion of the head portion 200 and coupled to an upper portion of the rotational portion 312 of the first hinge portion 310 to be capable of relatively rotating in the left and right directions of the main body case 100.

By the above-described structure, the head portion 200 is capable of rotating in the front and rear directions of the main body case 100 about the center of the first hinge portion 310 by a predetermined rotational angle and capable of rotating in left and right direction of the main body case about the second hinge portion 320 by a predetermined rotational angle.

In order for the hinge 300 to be selectively received in the main body case 100, the first hinge portion 310 is coupled to be capable of relatively sliding in a longitudinal direction of the main body case 100. To realize this, the hinge coupling portion 122 of the sliding case 120 is provided with a sliding groove 123 formed in the longitudinal direction to slidably receive the fixing portion 311 of the fist hinge portion 310.

The hinge portion capable of sliding in the longitudinal direction of the main body case 100 and selectively received in the main body case 100 is locked or unlocked from the main body case 100 by fixing and projection and groove 124 and 313 respectively formed on the main body case 100 and the first hinge portion 310. That is, by the fixing projection 124 formed on the inner wall of the sliding groove 123 and the fixing groove 313, which is formed on an side end of the fixing portion 311 of the first hinge portion 310 and in which the fixing projection 124 is to be hooked, the withdrawn and received state of the hinge portion 300 can be fixed. When the hinge portion 300 is received in the hinge coupling portion 122, the rotation of the first hinge portion 310 in the front and rear directions may be suppressed but the second hinge portion 320 may be still capable of rotating in the left and right directions. When the hinge portion 300 is withdrawn from the hinge coupling portion 122, the head portion 200 is projected from the main body case, in a state of which the head portion 200 can rotate in the left, right, front and rear directions by the first and second hinge portions 310 and 320.

Figure 13:
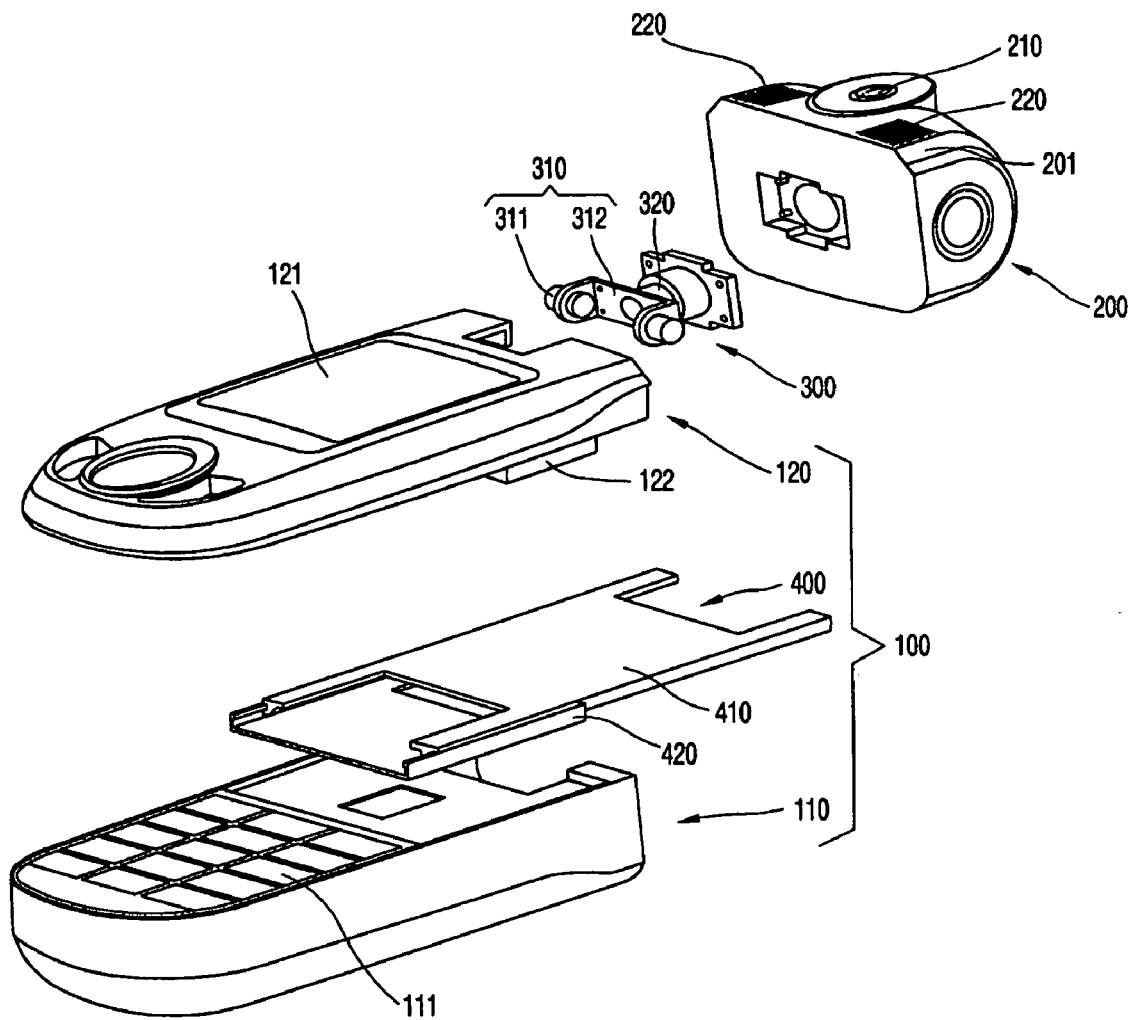
FIG. 13 is an exploded perspective view of a portable terminal with a camera rotating apparatus according to the present invention.

FIG. 13 is an exploded perspective view of the portable terminal with the camera rotating apparatus according to the present invention.

As described above, the portable terminal includes the main body case 100, the head portion 200 having a camera module 210 and mounted on an upper end of the main body case 100 to be capable of rotating in an omni-direction, and the hinge portion for rotatably connecting the head portion 200 on the main body case 100.

The main PCB (not shown) is provided in the main body case 100 to input information and control the communication. The main body case 100 includes the main case 110 provided with the keypad 111 and the slide case 120 provided with the display 121. The main case 110 and the slide case 120 can be opened and closed as they slides in their longitudinal directions by the sliding assembly 400. The sliding assembly 400 includes upper and lower plates 410 and 420 and a spring (not shown) interposed between the upper and lower plates 410 and 420. The upper plate 410 is slidably coupled to the lower plate 420. The lower plate 420 is fixed on the main case 110 and the upper plate 410 is fixed on the slide case 120.

The camera module 210 is provided on the mid-portion of the case 201 of the head portion 200 and the speakers 220 are provided on the case 201 at the both sides of the camera module 210.

The hinge portion 300 includes the first hinge portion 310 pivotally coupled to the main body case 100 and the second hinge portion 320 having the first end pivotally coupled to the first hinge portion 310 and the second end integrally coupled to the head portion 200.

The first hinge portion 310 includes the fixing portion 311 coupled to the hinge coupling portion 122 of the slide case 120 and the rotational portion 312 coupled to the slide case 120 to be capable of rotating in the front and rear directions about the fixing portion 311. The second hinge portion 320 is integrally coupled to the lower portion of the head portion 200 and coupled to the upper portion of the rotational portion 312 of the first hinge portion 310 to be capable of relatively rotating in the left and right directions of the main body case 100.

In order to prevent the lower portion of the head portion 200 from interfering an upper portion of the slide case 120 when the head portion 200 rotates in the front and rear directions of the main body case 100 about the first hinge portion 310, the hinge portion 300 is elevated upward from the slide case 120. Therefore, the head portion 200 is designed to be spaced apart from the upper portion of the slide case 120.

In order for the hinge 300 to be selectively received in the main body case 100, the first hinge portion 310 is coupled to be capable of relatively sliding in the longitudinal direction of the main body case 100. To realize this, the hinge coupling portion 122 of the sliding case 120 is provided with the sliding groove 123 formed in the longitudinal direction to slidably receive the fixing portion 311 of the fist hinge portion 310.

The mechanical constitution and operation for receiving the hinge portion 300 in the hinge coupling portion 122 and for projecting the hinge portion 300 out of the hinge coupling portion 122 will refer to FIG. 12.

By the above-described structure, in order to make a phone call, the user slides up the slide case 120 with respect to the main case 110 using a slide mechanism. In addition, the user can rotate the head portion 200 with the camera module 210 about the hinge portion 300 in the left, right and front and rear directions according to the scene he/she intends to take. In addition, since the hinge structure is symmetrically formed, the camera module can be located on the center of the head portion. Thus, the user can conveniently solve the one-side problem of the object focus. Furthermore, the sound output direction of the speakers 220 can be adjusted by rotating the head portion 200.

The user can carry and keep the portable terminal in a state where the first hinge portion 310 slides down into the main body case 100. That is, the user can carry and keep the portable terminal in a state where the head portion 200 closely contacts the main body case 100.

Figure 14:
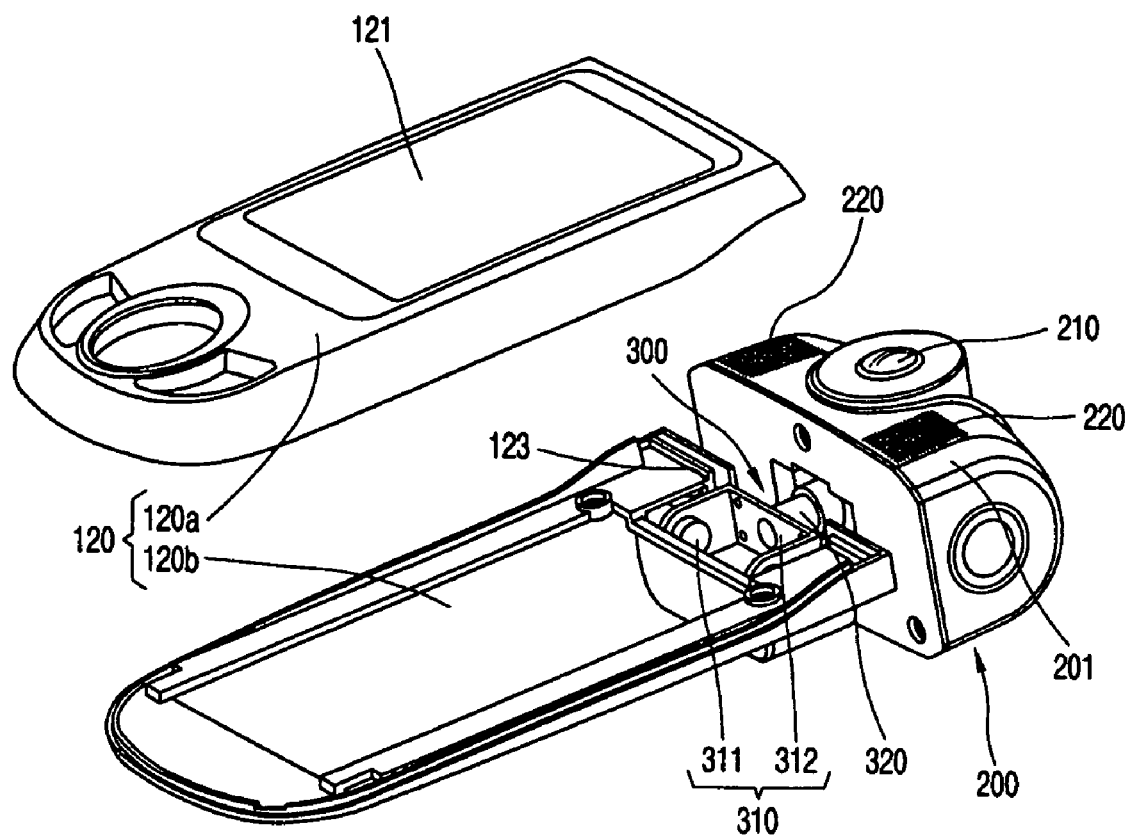
FIG. 14 is a perspective view of a coupling structure of a head portion of a portable terminal having a camera rotating apparatus according to an embodiment of the present invention.

FIG. 14 shows a coupling structure of the head portion of the portable terminal with the camera rotating apparatus according to the present invention.

The slide case 120 of the main body case 100 includes the upper and lower cases 120a and 120b. The display 121 is formed on the front surface of the upper case 120a. The head portion 200 is coupled to the upper end of the slide case 120 to be capable of rotating in the left, right, front and rear directions by the hinge portion 300. The camera module 210 is provided on the mid-portion of the case 201 of the head portion 200 and the speakers 220 are provided on the case 201 at the both sides of the camera module 210.

The hinge portion 300 includes the first and second hinge portions 310 and 320. The first hinge portion 310 includes a fixing portion 311 coupled to a hinge coupling portion 122 of the slide case 120 and a rotational portion 312 coupled to the slide case 120 to be capable of rotating in the front and rear directions about the fixing portion 311. The second hinge portion 320 is integrally coupled to the lower portion of the head portion 200 and coupled to the upper portion of the rotational portion 312 of the first hinge portion 310 to be capable of relatively rotating in the left and right directions of the main body case 100.

The head portion 200 is capable of rotating in front and rear directions of the main body case 100 about a center of the first hinge portion 310 by a predetermined rotational angle and capable of rotating in left and right direction of the main body case about the second hinge portion 320 by a predetermined rotational angle. In order for the hinge portion 300 to be selectively received in the main body case 100, the first hinge portion 310 is coupled to be capable of relatively sliding in the longitudinal direction of the main body case 100. To realize this, the hinge coupling portion 122 of the sliding case 120 is provided with the sliding groove 123 formed in the longitudinal direction to slidably receive the fixing portion 311 of the fist hinge portion 310.

In order to make a phone call, the user slides up the slide case 120 with respect to the main case 110 using a slide mechanism. In addition, the user can rotate the head portion 200 with the camera module 210 about the hinge portion 300 in the left, right and front and rear directions according to the scene he/she intends to take.

The user can carry and keep the portable terminal in a state where the first hinge portion 310 slides down into the main body case 100. That is, the user can carry and keep the portable terminal in a state where the head portion 200 closely contacts the main body case 100.

In the embodiments illustrated in conjunction with FIGS. 7 through 14, only a slide type portable terminal is exampled. However, the present invention is not limited to this case. For example, the inventive camera rotating apparatus can be applied to other types such as a folder type, a stick type and the like.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A camera rotating apparatus of a portable terminal, comprising:
   a main body of the portable terminal;
   a head portion comprising a camera module, the head portion being capable of rotating in front, rear, left and right directions with respect to the main body; and
   a hinge portion rotatably connecting the head portion to the main body,
   wherein the main body is a slide type and the hinge portion comprises a first hinge member directly connected to a second hinge member, the first hinge member for rotating the head portion in the front and rear directions and the second hinge member for rotating the head portion in the left and right directions.

2. The camera rotating apparatus according to claim 1, wherein the head portion comprises a speaker.

3. The camera rotating apparatus according to claim 1, wherein the head portion is selectively suppressed in its free rotation with respect to the main body.

4. The camera rotating apparatus according to claim 1, wherein the head portion is selectively suppressed in its rotation in the front and rear directions with respect to the main body but not suppressed in its rotation in the left and right directions.

5. The camera rotating apparatus according to claim 1, wherein the hinge portion is designed to be received in or withdrawn from the main body.

6. The camera rotating apparatus according to claim 5, wherein the hinge portion comprises a fixing member for fixing its current positions when it is received in or withdrawn from the main body.

7. A camera rotating apparatus of a portable terminal, comprising:
- a main body of the portable terminal;
- a head portion comprising a camera module, the head portion being capable of rotating in front, rear, left and right directions with respect to the main body;
- a first hinge member for rotating the head portion in the front and rear directions with respect to the main body;
- a second hinge member for rotating the head portion in the left and right directions with respect to the main body; and
- a hinge coupling member for selectively suppressing the rotation of the head portion by allowing the first and second hinge members to be received in or withdrawn from the main body,
- wherein the first hinge member and the second hinge member are directly connected.

8. The camera rotating apparatus according to claim 7, wherein the second hinge member is designed to couple the first hinge member to the head portion.

9. The camera rotating apparatus according to claim 7, wherein the coupling member includes a receiving portion formed on the main body to receive the first and second hinge members and a stopper formed on the first hinge member and the receiving portion to fix the current portion of the hinge portion when the hinge portion is received in or withdrawn from the receiving portion.

10. The camera rotating apparatus according to claim 7, wherein the main body is a slide type.

11. The camera rotating apparatus according to claim 7, wherein the head portion comprises a speaker.

12. A camera rotating apparatus of a portable terminal, comprising:
- a main body of the portable terminal, the main body comprising a slide case coupled to a main case by a sliding assembly to be capable of sliding with respect to the main case;
- a head portion comprising a camera module, the head portion being capable of rotating in front, rear, left and right directions with respect to the main body;
- a hinge coupling portion provided on the slide case;
- a first hinge member for rotating the head portion in the front and rear directions with respect to the main body; and
- a second hinge member for rotating the head portion in the left and right directions with respect to the main body,
- wherein the first hinge member and the second hinge member are directly connected.

13. The camera rotating apparatus according to claim 12, wherein the head portion comprises a speaker.

14. The camera rotating apparatus according to claim 12, wherein the hinge coupling portion comprises a slide assembly and a stopper that are used to receive or withdraw the first and second hinge members in and from the main body.

15. The camera rotating apparatus according to claim 12, wherein the rotation of the first hinge member is suppressed when the hinge portion is received in the hinge coupling portion and is not suppressed when the hinge portion is withdrawn from the hinge coupling portion.

16. The camera rotating apparatus according to claim 12, wherein in a position where the rotation of the first hinge member is suppressed, the rotation of the second hinge member is not suppressed.

* * * * *